(12) United States Patent
Furumachi et al.

(10) Patent No.: US 9,566,856 B2
(45) Date of Patent: Feb. 14, 2017

(54) FLUID-FILLED VIBRATION DAMPING DEVICE

(71) Applicants: SUMITOMO RIKO COMPANY LIMITED, Komaki-shi, Aichi (JP); TOYOTA JIDOSHA KABUSHIKI KAISHA, Toyota-shi, Aichi (JP)

(72) Inventors: Naoki Furumachi, Kasugai (JP); Takayoshi Yasuda, Kitanagoya (JP); Takeshi Kuniya, Toyota (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/735,492

(22) Filed: Jun. 10, 2015

(65) Prior Publication Data
US 2015/0369327 A1  Dec. 24, 2015

(30) Foreign Application Priority Data
Jun. 23, 2014  (JP) ................................. 2014-128638

(51) Int. Cl.
*F16F 13/00* (2006.01)
*B60K 5/12* (2006.01)
*F16F 13/10* (2006.01)

(52) U.S. Cl.
CPC ........... *B60K 5/1208* (2013.01); *F16F 13/107* (2013.01)

(58) Field of Classification Search
CPC ............ F16F 13/08; F16F 13/10; F16F 13/16; F16F 13/103; F16F 13/105; F16F 13/106; B60K 5/1208; B60K 5/12107
(Continued)

(56) References Cited

U.S. PATENT DOCUMENTS

| | | | | |
|---|---|---|---|---|
| 4,630,803 A | * | 12/1986 | Werner | B60G 7/04 188/321.11 |
| 4,739,978 A | * | 4/1988 | Bodin | F16F 13/107 188/320 |

(Continued)

FOREIGN PATENT DOCUMENTS

| | | |
|---|---|---|
| JP | 2003-148548 A | 5/2003 |
| JP | 2015-083856 A | 4/2015 |
| WO | 2015/012145 A1 | 1/2015 |

OTHER PUBLICATIONS

Jul. 12, 2016 Office Action issued in Canadian Patent Application No. 2,894,172.
(Continued)

*Primary Examiner* — Christopher Schwartz
(74) *Attorney, Agent, or Firm* — Oliff PLC

(57) ABSTRACT

A fluid-filled vibration damping device including: a first mounting member; a second mounting member; a main rubber elastic body elastically connecting the first and second mounting members; a pressure-receiving chamber whose wall is partially constituted by the main rubber elastic body; an equilibrium chamber whose wall is partially constituted by a flexible film, the pressure-receiving chamber and equilibrium chamber being filled with a non-compressible fluid; and an orifice passage which connects the pressure-receiving chamber and the equilibrium chamber to each other. A turbulence generating part is formed in a middle portion of the orifice passage in a length direction causing turbulence to be generated depending on a flow rate of a flowing fluid.

2 Claims, 4 Drawing Sheets

(58) Field of Classification Search
USPC .................................. 267/140.11–140.13
See application file for complete search history.

(56) References Cited

U.S. PATENT DOCUMENTS

| | | | | |
|---|---|---|---|---|
| 4,763,884 A * | 8/1988 | Matsui | ................... | F16F 13/28 |
| | | | | 267/121 |
| 4,796,875 A * | 1/1989 | Mertens | ................ | F16F 13/262 |
| | | | | 251/339 |
| 4,805,884 A * | 2/1989 | Jordens | ................... | F16F 13/26 |
| | | | | 267/140.14 |
| 4,836,512 A * | 6/1989 | Lun | ....................... | F16F 13/107 |
| | | | | 248/559 |
| 4,909,490 A * | 3/1990 | de Fontenay | ......... | F16F 13/262 |
| | | | | 138/30 |
| 7,802,777 B2 * | 9/2010 | Katayama | ............ | F16F 13/106 |
| | | | | 267/140.13 |
| 8,302,946 B2 * | 11/2012 | Kojima | ................... | F16F 13/16 |
| | | | | 248/638 |
| 2005/0077662 A1 * | 4/2005 | Garety | ................... | F16F 13/105 |
| | | | | 267/140.13 |
| 2010/0102495 A1 * | 4/2010 | Okumura | ............... | F16F 13/108 |
| | | | | 267/140.13 |
| 2010/0213652 A1 * | 8/2010 | Ichikawa | .............. | F16F 13/105 |
| | | | | 267/140.13 |
| 2011/0042872 A1 | 2/2011 | Hasegawa et al. | | |
| 2011/0155887 A1 * | 6/2011 | Ueki | .................... | B60K 5/1208 |
| | | | | 248/636 |
| 2013/0154171 A1 * | 6/2013 | Nishi | ................... | F16F 13/106 |
| | | | | 267/140.13 |
| 2015/0028530 A1 * | 1/2015 | Kanaya | ................. | F16F 13/103 |
| | | | | 267/140.13 |
| 2015/0260254 A1 * | 9/2015 | Furumachi | ............ | F16F 13/103 |
| | | | | 267/140.13 |

OTHER PUBLICATIONS

Mar. 14, 2016 Office Action issued in German Patent Application No. 102015109970.5.

* cited by examiner

FLUID-FILLED VIBRATION DAMPING DEVICE

INCORPORATED BY REFERENCE

The disclosure of Japanese Patent Application No. 2014-128638 filed on Jun. 23, 2014 including the specification, drawings and abstract is incorporated herein by reference in its entirety.

BACKGROUND OF THE INVENTION

1. Field of the Invention

The present invention relates to a fluid-filled vibration damping device to be used for an automotive engine mount and the like, for example.

2. Description of the Related Art

Conventionally, there has been known a vibration damping device as a kind of vibration damping coupling body or a vibration damping supporting body interposed between the members constituting a vibration transmission system to connect the members to each other in a vibration damping manner. In addition, for the purpose of improving the vibration damping performance, a fluid-filled vibration damping device using the vibration damping effect based on the flow action of a non-compressible fluid sealed therein is proposed. The fluid-filled vibration damping device has a structure where a first mounting member and a second mounting member are elastically connected by a main rubber elastic body, and a pressure-receiving chamber whose wall is partially constituted by the main rubber elastic body and an equilibrium chamber whose wall is partially constituted by a flexible film are formed, each containing a non-compressible fluid sealed therein, while an orifice passage is formed to connect the pressure-receiving chamber and the equilibrium chamber to each other.

Meanwhile, in case of a fluid-filled vibration damping device, cavitation noise generated at a shockingly large load input can become a problem. The cavitation noise is generated and sensed as an abnormal sound when a rapid local pressure drop occurs in the pressure-receiving chamber due to a large load input to cause local boiling of the non-compressible fluid or air bubbles due to the gas-liquid phase separation and the like of dissolved gas in the pressure-receiving chamber, and then, the air bubbles burst up by cancellation of the pressure drop so that the shock wave produced by the bubble burst is transmitted to the vehicular body to be felt as noise.

In order to prevent generation of air bubbles by means of cancelling the negative pressure in the pressure-receiving chamber as soon as possible, a fluid-filled vibration damping device formed with a short-circuit passage that communicates the pressure-receiving chamber and the equilibrium chamber to each other and provided with a valve that switches on and off the communication via the short-circuit passage has been proposed as disclosed in Japanese Unexamined Patent Publication No. JP-A-2003-148548. According to JP-A-2003-148548, once internal pressure of the pressure-receiving chamber drops down significantly at a shockingly large load input, the short-circuit passage shut off by the valve is switched to a communicating state so that the pressure-receiving chamber and the equilibrium chamber are communicated to each other by a short-circuit passage with small flow resistance. This allows the fluid to flow from the equilibrium chamber to the pressure-receiving chamber via the short-circuit passage to reduce the negative pressure in the pressure-receiving chamber, thus preventing generation of air bubbles caused by cavitation and avoiding the cavitation noise.

However, since the structure of JP-A-2003-148548 requires a valve that opens and closes at a given pressure, there was a problem of having difficulties in avoiding an increase in the number of components and more complex structure.

SUMMARY OF THE INVENTION

The present invention was made against the background described above, and the problem to be solved is to provide a fluid-filled vibration damping device with a novel structure where noise caused by cavitation can be reduced or avoided by a simple structure with fewer number of components.

Aspects of the present invention made to solve such problem are described below. The constituting elements in each of the aspects described therein can be adopted in any combination as possible.

That is, a first aspect of the present invention provides a fluid-filled vibration damping device comprising: a first mounting member; a second mounting member; a main rubber elastic body elastically connecting the first and second mounting members; a pressure-receiving chamber whose wall is partially constituted by the main rubber elastic body; an equilibrium chamber whose wall is partially constituted by a flexible film, the pressure-receiving chamber and equilibrium chamber being filled with a non-compressible fluid; and an orifice passage which connects the pressure-receiving chamber and the equilibrium chamber to each other, wherein a turbulence generating part is formed in a middle portion of the orifice passage in a length direction causing turbulence to be generated depending on a flow rate of a flowing fluid.

According to the fluid-filled vibration damping device with the structure of the first aspect described above, when the fluid tries to flow through the orifice passage at a high flow rate, the flowing fluid generates turbulence at the turbulence generating part to place limitation on the flow rate of the flowing fluid and cause the gas-liquid phase separation due to small-scale cavitation at the turbulence generating part. This reduces the pressure loss caused by the turbulence when the flowing fluid flows from the orifice passage into the pressure-receiving chamber to prevent the pressure around the opening of the orifice passage in the pressure-receiving chamber from locally dropping down significantly. As a result, air bubbles that are likely to be generated around the opening of the orifice passage are prevented, thus enabling to reduce or avoid noise caused by shock waves emitted at the time of bubble burst.

Furthermore, since the flow rate of the fluid flowing through the orifice passage is comparatively low at a normal vibration input that causes no cavitation problem, the turbulence at the turbulence generating part is prevented to allow for more efficient fluid flow. Therefore, a vibration damping effect based on the flow action of the fluid through the orifice passage is effectively achieved. In other words, since the preventive effect against the cavitation noise based on the energy loss and gas-liquid phase separation at the turbulence generating part can be exerted depending on the flow rate of the fluid flowing through the orifice passage, the vibration damping effect and preventive effect against the cavitation noise due to the orifice passage are properly exerted in response to the vibration input.

In addition, since the turbulence generating part can be realized by a simple structure where only convex and concave portions are formed on the wall inner surface of the orifice passage without any need for a complicated switching mechanism as in the conventional valve system, reduction in the number of components and the subsequent simplification of the structure can be achieved.

A second aspect of the present invention provides the fluid-filled vibration damping device according to the first aspect, wherein a concave portion is formed to open on a wall inner surface of the orifice passage, and the turbulence generating part comprises the concave portion.

According to the second aspect, by means of varying the cross-sectional area of the orifice passage at the formation of the concave portion, a significant pressure loss (energy loss) is caused by turbulence at the formation of the concave portion when the fluid tries to flow at a flow rate so high as to generate cavitation. This can result in limitation in the flow rate of the flowing fluid as well as alleviation of pressure fluctuations due to small-scale cavitation. As a result, the pressure loss caused by the turbulence generated around the opening of the orifice passage on the side of the pressure-receiving chamber is reduced to alleviate the bubble formation caused by cavitation in the pressure-receiving chamber and the generation of noise following the burst of air bubbles.

Meanwhile, at the input of normal vibration to be damped that does not involve cavitation, the flow rate of the fluid flowing through the orifice passage is comparatively low so that generation of turbulence at the concave portion is restricted and the pressure loss due to the turbulence is reduced enough not to be an issue. Therefore, the vibration damping effect based on the resonance action and the like of the fluid flowing through the orifice passage is effectively exerted without being substantially affected by the concave portion. Especially, since the turbulence generation part is configured as a concave portion rather than a convex portion projecting into the orifice passage, adverse effects of the turbulence generation part on the flow characteristics at the input of normal vibration is effectively mitigated.

According to the present invention, restriction of the flow rate of the flowing fluid and the gas-liquid phase separation at a small scale and so forth is imposed by generating turbulence at the turbulence generating part provided in a middle portion of the orifice passage, and generation of air bubbles caused by cavitation around the opening of the orifice passage to the pressure-receiving chamber is reduced, thus effectively alleviating or eliminating the noise caused by bubble burst with a simple structure.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 5A and 5B are graphs showing measurement results of dynamic loads applied to engine mounts having a structure of the present invention and having a conventional structure, respectively, wherein FIG. 5A shows measurement results at the time of large load input that can cause cavitation and FIG. 5B shows measurement results at the time of normal vibration input to be damped.

DETAILED DESCRIPTION OF PREFERRED EMBODIMENTS

Embodiments of the present invention will be described below in reference to the drawings.

Figure 1:
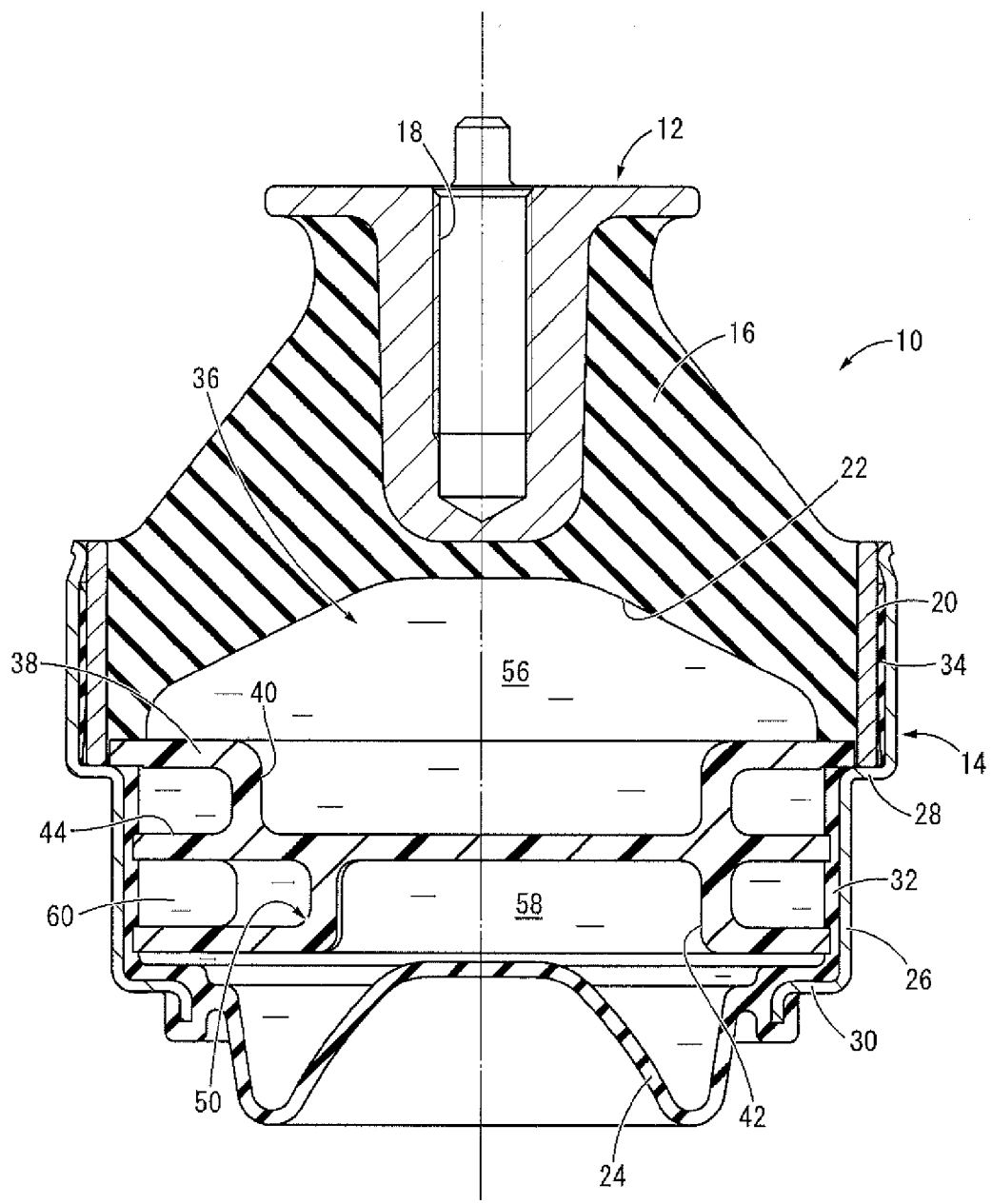
FIG. 1 is a vertical cross section view showing a fluid-filled vibration damping device in the form of an engine mount as a first embodiment of the present invention.

FIG. 1 shows an automotive engine mount 10 as a first embodiment of the fluid-filled vibration damping device with a structure according to the present invention. The engine mount 10 has a structure where a first mounting member 12 and a second mounting member 14 are elastically connected by a main rubber elastic body 16. In the following descriptions, "up-down direction" generally means the up-down direction in FIG. 1, which coincides with the direction of the mount's central axis.

More specifically, the first mounting member 12 is a high-rigidity member formed of metal such as iron or aluminum alloy or the like, and is made in an approximate shape of a circular block as a whole where a screw hole 18 is formed to extend up and down along the central axis opening to the top face.

Also, below the first mounting member 12, a sleeve member 20 is arranged. The sleeve member 20 is a high-rigidity member like the first mounting member 12 being made in an approximate shape of a thin and large diameter circular cylinder.

Then, the first mounting member 12 and the sleeve member 20 are arranged above and below on the same central axis and are elastically connected to each other by the main rubber elastic body 16. The main rubber elastic body 16 is made in an approximate shape of a thick and large diameter truncated cone, the smaller diameter end of which is bonded by vulcanization to the first mounting member 12, while the outer peripheral face of the large diameter end is bonded by vulcanization to the inner peripheral face of the sleeve member 20. In addition, a large-diameter recess 22 is formed in the main rubber elastic body 16. The large-diameter recess 22 is a recess that opens to the large diameter side end face of the main rubber elastic body 16 being made in an approximate shape of a reverse bowl with its diameter gradually increasing toward the opening. The main rubber elastic body 16 is formed as an integral vulcanization-molded product provided with the first mounting member 12 and the sleeve member 20, and by means of applying a crimping process to the sleeve member 20 after vulcanization molding of the main rubber elastic body 16, the tensile strain caused by contraction of the main rubber elastic body 16 after the molding is reduced.

Also, the sleeve member 20 is attached with a flexible film 24. The flexible film 24 is a thin rubber film in an approximate shape of a disc or a circular dome being made easily deformable by deflection in the up and down direction.

In addition, at the outer peripheral edge of the flexible film 24, a fixing member 26 is bonded by vulcanization. The fixing member 26 is in an approximate shape of a thin and large diameter circular cylinder as a whole, and the upper part of a step portion 28 formed in the middle portion has a larger diameter than the lower part thereof where an inner flange 30 is integrally formed to protrude inward from the bottom edge. Then, the outer peripheral edge of the flexible film 24 is bonded by vulcanization to the inner peripheral edge of the inner flange 30 all around the circumference and the bottom opening of the fixing member 26 is closed by the flexible film 24 in a fluid-tight manner. Furthermore, a first sealing rubber layer 32 is fixed to the inner peripheral surface of the smaller diameter section of the fixing member 26, while a second sealing rubber layer 34 is fixed to the inner peripheral surface of the larger diameter section of the fixing member 26. In the present embodiment, the first sealing rubber layer 32 is integrally formed with the flexible film 24, while the second sealing rubber layer 34 is made separately from the flexible film 24.

Then, by means of having the larger diameter section of the fixing member 26 fitted externally onto the sleeve member 20 to be fixed in place by a diameter-reducing process such as all-round crimping, the second mounting member 14 is composed of the sleeve member 20 and the fixing member 26. The second sealing rubber layer 34 is pressed against the outer peripheral surface of the sleeve member 20 so that the space between the fixing member 26 and the sleeve member 20 is sealed in a liquid-tight manner.

This allows a fluid chamber 36 to be formed between the opposing faces of the main rubber elastic body 16 and the flexible film 24 that is separated from the exterior space in a fluid-tight manner, and a non-compressible fluid is sealed in the fluid chamber 36. The non-compressible fluid sealed therein is not particularly limited, but for example, liquid such as water, ethylene glycol, alkylene glycol, polyalkylene glycol, silicone oil, or a mixture liquid thereof or the like can be adopted. In addition, a fluid of low viscosity at 0.1 Pa·s or less is preferably used in order to efficiently obtain the vibration damping effect based on the fluid flow action described in later paragraphs.

Figure 2:
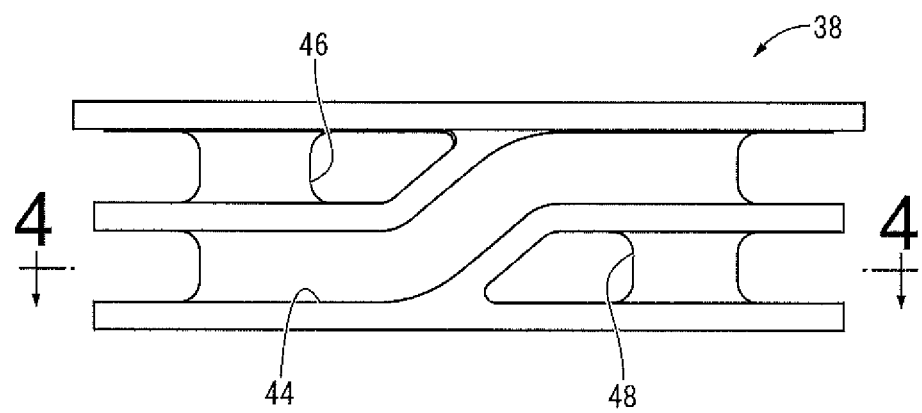
FIG. 2 is a front view of the partition member constituting the engine mount shown in FIG. 1.
Figure 3:
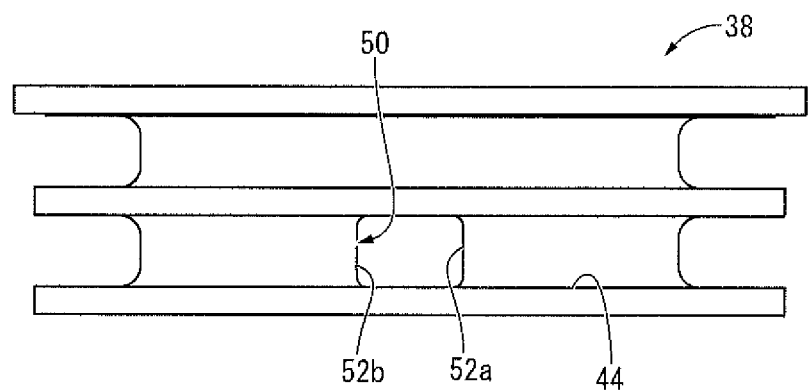
FIG. 3 is a rear view of the partition member shown in FIG. 2.
Figure 4:
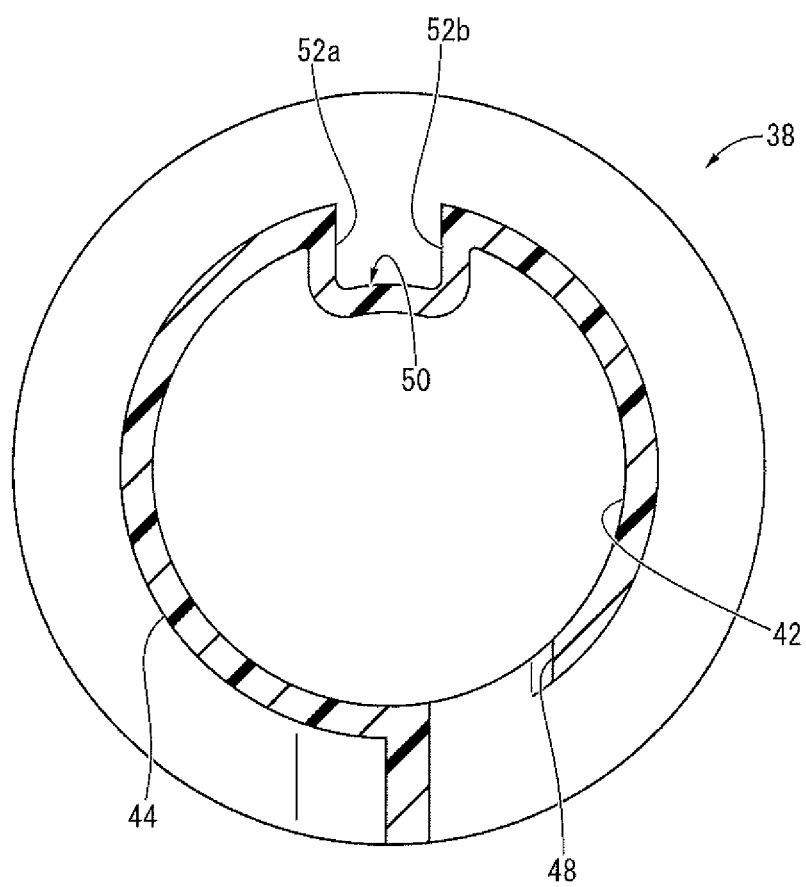
FIG. 4 is a cross section view taken along line 4-4 of FIG. 3.

Also, a partition member 38 is arranged in the fluid chamber 36. As shown in FIGS. 2 to 4, the partition member 38 is in an approximate shape of a disc and is formed of metal such as aluminum alloy or hard synthetic resin. In addition, as shown in FIG. 1, an upper recess 40 opening to the top face and a lower recess 42 opening to the bottom face are formed in the center of the partition member 38 in the radial direction.

Furthermore, as shown in FIGS. 1 to 3, a peripheral groove 44 is formed along the outer peripheral edge of the partition member 38. The peripheral groove 44 extends for a length slightly less than two rounds of circumference in a helical manner opening toward the outer periphery, one end of which is communicated with the upper recess 40 via an upper communication hole 46, while the other end is communicated with the lower recess 42 via a lower communication hole 48.

Moreover, as shown in FIGS. 1 and 3, a concave portion 50 is formed in the middle of the peripheral groove 44 in the length direction as a turbulence generating part opening on the inner peripheral face thereof. The concave portion 50 is formed at one part of the peripheral groove 44 in the length direction, and in the present embodiment, it is formed at a location biased to the side of the lower communication hole 48 in the length direction of the peripheral groove 44. As shown in FIGS. 3 and 4, the concave portion 50 of the present embodiment extends in the radial direction with nearly a constant cross-section, while a pair of side wall inner surfaces 52a, 52b positioned on both sides of the circumferential direction extend in a direction nearly perpendicular to the length direction of the peripheral groove 44.

Then, as shown in FIG. 1, the partition member 38 is arranged to extend in the axis-perpendicular direction within the fluid chamber 36 with its outer peripheral edge supported by the second mounting member 14. More specifically, the partition member 38 is inserted into the smaller diameter section of the fixing member 26 from above, and thereafter the integral vulcanization-molded product of the main rubber elastic body 16 is inserted into the larger diameter section of the fixing member 26 from above, and then diameter-reducing work is applied to the fixing member 26. This allows the outer periphery of the upper end of the partition member 38 to be pinched in the up-down direction between the main rubber elastic body 16 and the fixing member 26, while the outer peripheral face of the partition member 38 is pressed against the smaller diameter section of the fixing member 26 via the first sealing rubber layer 32 so that the partition member 38 gets supported by the second mounting member 14.

By such an arrangement of the partition member 38 within the fluid chamber 36, the fluid chamber 36 is divided into upper and lower sections across the partition member 38. That is, above the partition member 38, part of the wall is composed of the main rubber elastic body 16, and a pressure-receiving chamber 56 is formed where internal pressure fluctuations are caused at the time of vibration input. Meanwhile, below the partition member 38, part of the wall is composed of the flexible film 24, and an equilibrium chamber 58 is formed that easily allows volume changes therein. Needless to say, the pressure-receiving chamber 56 and the equilibrium chamber 58 are each filled with a non-compressible fluid sealed therein.

Also, by having the opening of the peripheral groove 44 on the outer peripheral side covered by the second mounting member 14 in a fluid-tight manner, a tunnel-like flow passage is formed to extend along the circumference, and one end of the tunnel-like flow passage is communicated with the pressure-receiving chamber 56 via the upper communication hole 46, while the other end thereof is communicated with the equilibrium chamber 58 via the lower communication hole 48. This allows an orifice passage 60 that communicates the pressure-receiving chamber 56 and the equilibrium chamber 58 with each other to be formed using the peripheral groove 44. The tuning frequency of the orifice passage 60 of the present embodiment, which is the resonance frequency of the flowing fluid, is set low at about 10 Hz, equivalent to that of engine shake by means of adjusting the ratio (A/L) of cross-sectional area (A) of the passage to the passage length (L) in consideration of rigidity of the wall spring of the fluid chamber 36.

Furthermore, a concave portion 50, as a turbulence generating part, opens on the wall inner surface of the orifice passage 60 on the inner peripheral side. This makes the cross-sectional area of the orifice passage 60 partially larger at a location on the circumference where the concave portion 50 is formed (see FIG. 1). In the present embodiment, the side wall inner surfaces 52a, 52b of the concave portion 50 are approximately perpendicular to the length direction of the orifice passage 60, and the cross-sectional area of the orifice passage 60 is drastically increased at the formation of the concave portion 50.

The engine mount 10 with the structure described above is interposed between a power unit and a vehicular body by having the first mounting member 12 mounted to the power unit, not shown, and the second mounting member 14 mounted to the vehicular body, not shown.

Under an on-vehicle condition of such engine mount 10, once a low frequency high amplitude vibration is inputted equivalent to that of the engine shake, a fluid flow through the orifice passage 60 is generated between the pressure-receiving chamber 56 and the equilibrium chamber 58 due to the relative pressure fluctuations in the two chambers. As a result, the desired vibration damping effect (high attenuation effect) is achieved based on flow actions such as resonance action of the fluid.

Meanwhile, when a shockingly large load is inputted between the first mounting member 12 and the second mounting member 14 to produce a large negative pressure in the pressure-receiving chamber 56, the fluid tries to flow from the equilibrium chamber 58 into the pressure-receiving chamber 56 via the orifice passage 60 due to the relative pressure fluctuations in the two chambers. Under these circumstances, cavitation noise is reduced or avoided in the engine mount 10 by having the concave portion 50 formed to open on the wall inner surface of the orifice passage 60.

Such a preventive effect against cavitation noise is deemed to be exerted, for example, in the following manner. That is, air bubbles produced by cavitation are known to be generated around the opening of the orifice passage 60 in the pressure-receiving chamber 56, which is assumed to be caused by a drastic drop of the liquid pressure in the pressure-receiving chamber 56 around the opening of the orifice passage 60 due to local pressure loss caused by fine-scale eddies resulting from turbulence generated when the fluid flows from the orifice passage 60 into the pressure-receiving chamber 56. Since the magnitude of such pressure loss is significantly related to the flow rate of the fluid flowing through the orifice passage 60, the pressure loss is considered effective in reducing the flow rate of the fluid flowing through the orifice passage 60.

Now, in the orifice passage 60 of the engine mount 10, the cross-sectional area is partially modified at the formation of the concave portion 50 so as to magnify the generation of energy loss of the flowing fluid by having turbulence at the concave portion 50 as opposed to an orifice passage with the conventional structure with a constant cross-sectional area of the passage. In other words, by means of forming the concave portion 50, the flow resistance is made to increase when the fluid flow rate is increased through the orifice passage 60. This suppresses the fluid flow rate through the orifice passage 60 and reduces the pressure loss when the fluid flows from the orifice passage 60 into the pressure-receiving chamber 56, thus preventing cavitation air bubbles caused by a local negative pressure of a significant magnitude.

The energy loss caused by the concave portion 50 is exerted sufficiently enough when a shockingly large load that causes a problem of cavitation is inputted because of the high flow rate in the orifice passage 60, resulting in effective suppression of such flow rate. Meanwhile, when a vibration to be damped equivalent to that of engine shake and the like is inputted, the energy loss caused by the concave portion 50 hardly affects the flow characteristics of the fluid due to the comparatively low flow rate in the orifice passage 60, thus effectively exerting the vibration damping effect due to the flow action of the fluid. Therefore, the simple structure with the formation of the concave portion 50 that opens on the wall inner surface of the orifice passage 60 enables to prevent generation of cavitation noise while effectively achieving the desired vibration damping effect.

Also, at the formation of the concave portion 50, cavitation is likely to occur due to the local pressure loss caused by fine-scale eddies resulting from turbulence, while the cross-sectional area of the orifice passage 60 is partially made larger so that the capacity per unit length of the passage, and therefore, the dissolved gas volume per the unit length of the passage gets larger. For these reasons, cavitation air bubbles can occur also at the formation of the concave portion 50 at the input of a shockingly large load.

As a result, the sealed fluid that can be primarily considered as a non-compressible fluid (fluid flowing through the orifice passage 60) also exhibits some characteristics of a compressible fluid due to the gas-liquid phase separation, and at the opening to the pressure-receiving chamber 56 located downstream from the concave portion 50, conformability of the flowing fluid to the pressure fluctuations gets improved, while the pressure differential is alleviated due to the compressibility of the air bubbles generated at the concave portion 50, and as a result, the negative pressure created in the pressure-receiving chamber 56 can be reduced, thus enabling to suppress generation of cavitation air bubbles caused by the gas-liquid phase separation in the pressure-receiving chamber 56.

Figure 5A:
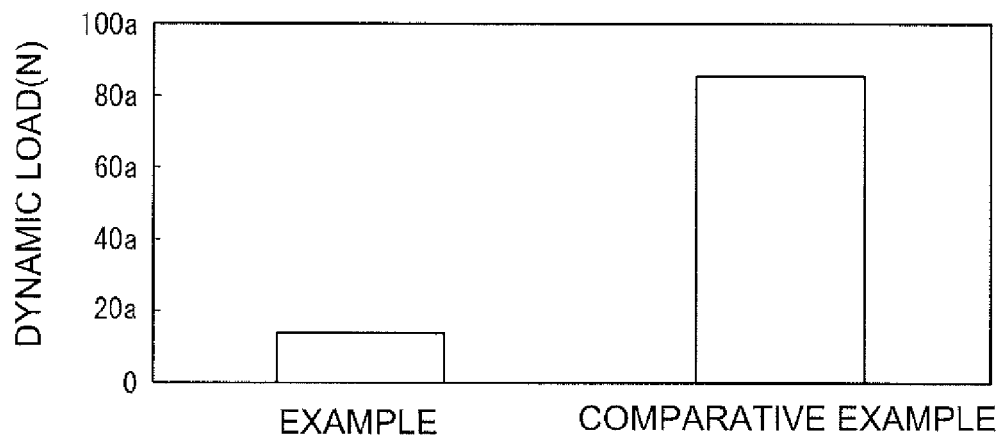
Figure 5B:
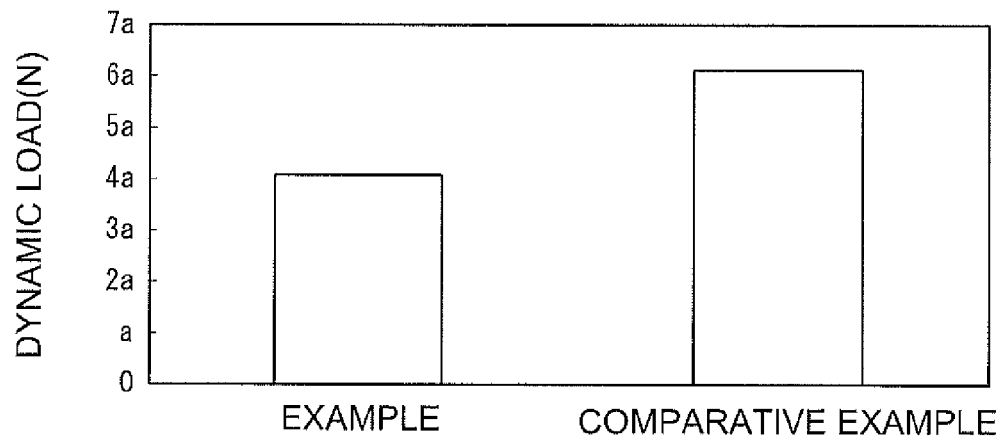

It has been verified by experimental tests that the fluid-filled vibration damping device relating to the present invention reduces the cavitation noise as opposed to a fluid-filled vibration damping device with the conventional structure. That is. FIGS. 5A and 5B show measurement results of a dynamic load applied to a fluid-filled vibration damping device with the structure according to the present invention with the orifice passage 60 provided with the concave portion 50 (Example) and measurement results of a dynamic load applied to a fluid-filled vibration damping device with the conventional structure without the concave portion 50 (Comparative Example). In the experiment to obtain the measurement results shown in FIGS. 5A and 5B, measurements were conducted by inputting vibration loads with the frequency of 10 Hz and the amplitude of ±1.5 mm as a condition of inputting large loads that cause a problem of cavitation (FIG. 5A), while other measurements were conducted by inputting vibration loads with the frequency of 10 Hz and the amplitude of ±0.5 mm as a condition of inputting normal vibration to be damped (FIG. 5B).

According to the measurement results of FIG. 5A, it is obvious that the dynamic load of the Example is much less than that of the Comparative Example at a large load input that causes a problem of cavitation. From these measurement results, it is inferable that the shock wave caused by cavitation is reduced in the Example pertaining to the present invention as opposed to the Comparative Example relating to the conventional structure, and thus the reduction in the noise caused by cavitation has been confirmed.

Meanwhile, according to the measurement results of FIG. 5B, the difference in dynamic loads between the Example and Comparative Example is significantly smaller than that of the measurement results of FIG. 5A, which leads us to believe that the Example exhibits a vibration damping effect to the equivalent of the Comparative Example.

As described above, it was confirmed from the measurement results of the experiment that the vibration damping effect by the orifice passage is effectively exerted at an input of normal vibration to be damped in the fluid-filled vibration damping device relating to the present invention, while the noise caused by cavitation is attenuated at the time of shockingly large load input.

Embodiments of the present invention have been described above, but the present invention is not limited to those specific descriptions. For example, in the embodiment described above, the concave portion 50 is formed in the orifice passage 60 near the equilibrium chamber 58, but the formation location of the concave portion 50 in the orifice passage 60 is not particularly limited, and it can be formed at a location closer to the pressure-receiving chamber 56 or a location equally away from both the pressure-receiving chamber 56 and the equilibrium chamber 58.

In addition, the concave portion 50 can be formed in plurality on the orifice passage 60, in which case the shape and size can differ from each other. Furthermore, the specific shape of the concave portion 50 shown in the embodiment described above is just an example, and the side wall inner surfaces of the concave portion can be made tapered and inclined against the length direction of the orifice passage 60, for example, and the cross-sectional area of the orifice passage 60 can be gradually varied at the formation of the concave portion 50.

Moreover, the concave portion does not necessarily have to be formed to open on the inner surface of the inner peripheral wall of the orifice passage but can be formed to open on the inner surface of the upper and lower walls, or the outer peripheral wall of the orifice passage.

Also, in the embodiment described above, the concave portion 50 is exemplified as a turbulence generating part, but this turbulence generating part may have a structure such that the cross-sectional area of the orifice passage 60 is partially modified so as to cause larger energy loss in the flowing fluid than other sections of the orifice passage, and even a projection or the like that partially narrows down the passage can be adopted, for example.

Also, the orifice passage is not limited to the one extending in the circumferential direction, but for example, a linear passage that extends in the axial direction can be adopted. In addition, even when the orifice passage extends in the circumferential direction, it can be formed in a length a little less than one round or no less than two rounds of the circumference.

Furthermore, the orifice passage can be provided in plurality with different tunings from each other, in which case the turbulence generating part is provided in at least one of the orifice passages. Also, the present invention is applicable to a switchable fluid-filled vibration damping device that can switch on and off the plurality of orifice passages with valves or even an active-type fluid-filled vibration damping device that offsets any vibration input by applying an active exciting force to the pressure-receiving chamber.

Also, the applicable range of the present invention is not limited to the engine mount, but can be expanded to the sub-frame mount, body mount and differential mount and so forth. In addition, the present invention is not only applicable to the fluid-filled vibration damping device for automobiles but is also favorably applicable to the fluid-filled vibration damping device for motorcycles, railroad cars, industrial vehicles and the like.

What is claimed is:

1. A fluid-filled vibration damping device comprising:
a first mounting member;
a second mounting member;
a main rubber elastic body elastically connecting the first and second mounting members;
a pressure-receiving chamber whose wall is partially constituted by the main rubber elastic body;
an equilibrium chamber whose wall is partially constituted by a flexible film, the pressure-receiving chamber and equilibrium chamber being filled with a non-compressible fluid; and
an orifice passage which connects the pressure-receiving chamber and the equilibrium chamber to each other through communication holes at both ends thereof, wherein:
the orifice passage has a turbulence generating part formed in a middle portion of the orifice passage located between the communication holes in a length direction of the orifice passage, the turbulence generating part has a structure such that a cross-sectional area of the orifice passage is partially modified, and is configured to cause turbulence to be generated depending on a flow rate of a flowing fluid; and
a wall inner surface of the orifice passage is partially concaved without being cut away so as to provide a concave portion so that the cross-sectional area of the orifice passage is partially enlarged at a location where the concave portion is formed, and the turbulence generating part comprises the concave portion.

2. The fluid-filled vibration damping device according to claim 1, wherein a pair of side walls of the concave portion positioned on both sides of the length direction of the orifice passage extend in a direction nearly perpendicular to the length direction.

* * * * *